US006421576B1

(12) United States Patent
Sermund

(10) Patent No.: US 6,421,576 B1
(45) Date of Patent: Jul. 16, 2002

(54) METHOD AND DEVICE TO CONTROL AN ENGRAVING DEVICE

(75) Inventor: Gerald Johannes Sermund, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/254,293

(22) PCT Filed: Aug. 12, 1997

(86) PCT No.: PCT/DE97/01721

§ 371 (c)(1),
(2), (4) Date: Jun. 1, 1999

(87) PCT Pub. No.: WO98/09817

PCT Pub. Date: Mar. 12, 1998

(30) Foreign Application Priority Data

Sep. 4, 1996 (DE) ........................................ 196 35 831

(51) Int. Cl.$^{7}$ .......................... G06F 19/00; B41C 1/045

(52) U.S. Cl. ....................... 700/160; 700/175; 700/195; 358/299

(58) Field of Search ................................ 700/160, 175, 700/174, 117, 195, 180, 303, 173; 358/299; 101/401.1

(56) References Cited

U.S. PATENT DOCUMENTS

| | | | | |
|---|---|---|---|---|
| 2,241,120 A | | 5/1941 | Dalton | 90/13 |
| 2,881,246 A | | 4/1959 | Fairchild | 178/6.6 |
| 4,181,077 A | | 1/1980 | Dalton | 101/401.1 |
| 5,029,011 A | | 7/1991 | Fraser | 358/299 |
| 5,424,845 A | | 6/1995 | Holowko et al. | 358/299 |
| 5,440,398 A | | 8/1995 | Holowko et al. | 358/299 |
| 5,491,559 A | | 2/1996 | Buechler | 358/299 |
| 5,808,748 A | * | 9/1998 | Brewer et al. | 358/299 |
| 5,818,605 A | * | 10/1998 | Crewe et al. | 358/299 |

FOREIGN PATENT DOCUMENTS

| | | |
|---|---|---|
| DE | 25 08 985 | 4/1978 |
| EP | 0 710 550 A2 | 8/1996 |

* cited by examiner

*Primary Examiner*—Leo Picard
*Assistant Examiner*—Steven R. Garland
(74) *Attorney, Agent, or Firm*—Schiff Hardin & Waite

(57) ABSTRACT

In a method and system to control an engraving device for the engraving of printing forms by means of an engraving tool controlled by a driving system, set engraving values for the cups along with engraving signal values are produced from engraving data as a control signal for the driving system. Working strokes of the engraving tool and distances between the printing form and the engraving tool are measured and actual values of engraving depth are determined from the differences and compared to set engraving depth values. The control signal is turned on at beginning of engraving and off when the engraving depth is reached. Set values for pressure force and tracking force are obtained and compared to actual pressure force values applied to the engraving tool and the actual tractive force values applied to a return element of the engraving tool. Exceeded set values are indicated. The control signal is corrected according to pressure force and tractive force measurement to allow for differing hardnesses of material.

49 Claims, 5 Drawing Sheets

$T_L$ t
$I_S$
$G_2$
$G_1$ t
$S_2$ t $E_{1\ SOLL}$
$E_{2\ SOLL}$

METHOD AND DEVICE TO CONTROL AN ENGRAVING DEVICE

BACKGROUND OF THE INVENTION

The invention relates to the area of electronic reproduction technology, and relates to a method and a means for controlling the engraving device of an electronic engraving machine for engraving print forms, in particular of print cylinders, for rotogravure by means of an engraving tool as a cutting tool, and relates to a corresponding engraving device.

In the engraving of print cylinders in an electronic engraving machine, an engraving device with an engraving tool as a cutting tool moves in the axial direction on a rotating print cylinder, and the engraving tool, controlled by an engraving signal, cuts a series of recesses arranged in a rotogravure raster, which recesses are called cups in the following, into the jacket surface of the print cylinder. The engraving signal is formed from the superposition of an image signal, representing the tone values between “black” and “white,” with a periodic raster signal, which, together with the relative speed between the print cylinder and the engraving device, determines the geometry of the rotogravure raster. While the periodic raster signal effects a vibrating piston movement of the engraving tool, the image signal controls the penetration depths of the engraving tool into the jacket surface of the print cylinder, and thereby the volumes of the engraved cups, in a manner corresponding to the tone values to be reproduced. In a printing machine, the cups engraved into the print cylinder are filled with more or less ink corresponding to their volumes, which ink is then transferred onto the print medium during the print process from the cups of the print cylinder.

In the engraving in particular of rastered color separations of a set of color plates, high tolerances must be maintained with respect to the positions of the engraved cups in the rotogravure raster and with respect to the shape and depth of the engraved cups. Deviations of position of the cups from the rotogravure raster lead to moire phenomena and color play in the combined printing of the rastered color separations. Deviations of the penetration depths or, respectively, engraving depths alter the cup volumes and thereby the quantities of ink stored in the cups. This results in disturbing tone value falsifications on the print medium.

From DE-A-23 36 089, an electromagnetic engraving device is known, i.e., an engraving device with an electromagnetic drive element for the engraving tool. The electromagnetic drive element consists of a stationary electromagnet that is charged with the engraving signal, in the air gap of which the armature of a rotating system moves. The rotating system consists of a shaft, the armature, a bearing for the shaft, and a damping means. One end of the shaft goes over into a resilient torsion rod that is clamped in a spatially fixed manner, while the other end of the shaft bears a lever to which the engraving tool is attached. By means of the magnetic field produced in the electromagnet, an electrical torque is exerted on the armature of the shaft, which is counteracted by the mechanical torque of the torsion rod. The electrical torque deflects the shaft from an idle position by an angle of rotation proportional to the engraving signal, and the torsion rod brings the shaft back into the idle position. By means of the rotational motion of the shaft, the engraving tool executes a stroke directed in the direction toward the jacket surface of a print cylinder, which stroke determines the penetration depth of the engraving tool into the print cylinder.

Because the electromagnetic engraving device represents a system capable of oscillation, the engraving tool, in particular given abrupt changes of the engraving signal at steep density transitions (contours), has a transient response that is subject to error, which is influenced by the rotational inertia and the degree of damping of the rotational system. An error-prone transient response of the engraving tool results in engraving errors on the print cylinder or, respectively, disturbing changes in tone value in the printing. Given an insufficient damping of the rotational system, disturbing multiple contours arise at density jumps, due to overshootings of the engraving tool. Given an excessively strong damping of the rotational system, the engraving tool can follow too slowly at steep density transitions, and the target engraving depth is reached only at a distance after the jump in density, whereby steep jumps in density are reproduced imprecisely.

Thus, disturbing engraving errors can occur in a conventional electromagnetic engraving device, because the transient reactions can be controlled only with difficulty. In addition, the temperature-dependent degree of attenuation of the rotational system can be stabilized only at great expense.

From EP-B-0 437 421, a method is known with which the transient response of an electromagnetic engraving device is improved by means of a specific electrical driving of the engraving device. For this purpose, the image signal is briefly intermediately stored in a memory stage, and is supplied to the engraving device in a manner delayed by the storage time. During the storage time, a correction signal is derived from the image signal that can be adjusted in its amplitude and in its effective duration, which correction signal is supplied to the engraving device in a chronologically rapid manner.

From U.S. Pat. No. 5,491,559, a magnetostrictive engraving device is known for the engraving of print cylinders, i.e., an engraving device with a magnetostrictive drive element for the engraving tool. The magnetostrictive drive element essentially comprises a cylindrical actuator made of a magnetostrictive material, to which the engraving tool is coupled. The actuator is surrounded by an annular auxiliary coil through which a direct current flows and by an annular driver coil through which an alternating current flows. The direct current produces a constant magnetic field in the auxiliary coil for the pre-magnetization of the actuator. By means of the pre-magnetization, the actuator is expanded into a pre-stressed position. The alternating current produces a dynamic magnetic field with changing direction in the driver coil, which is superimposed on the constant magnetic field, whereby the resulting magnetic field causes, according to the direction, a further expansion of the actuator into an operating position for engraving or a contraction of the actuator into an idle position. The drive circuit for the magnetostrictive engraving device consists essentially of a current generator for the production of the direct current for the auxiliary coil and a voltage/current transducer. The image signal, containing the engraving information, and an alternating voltage with constant frequency are supplied as a raster signal to the voltage/current transducer, which raster signal effects the oscillating piston motion of the engraving tool for the production of the rotogravure raster.

SUMMARY OF THE INVENTION

The object of the present invention is thus to improve a method and a means for controlling the engraving device for engraving print forms, in particular of print cylinders, for rotogravure by means of an engraving tool as a cutting tool, as well as improving an engraving device, in such a way that disturbing changes of operating parameters of the engraving device are compensated in order to achieve rapid and error-free engravings.

According to the present invention, a method is provided for driving an engraving device of an electronic engraving machine for engraving a print form. Items of engraving information representing tone values are stored as engraving data. The information for engraving of a sequence of cups in a main engraving direction into the print form with an engraving tool as a cutting tool are retrieved. The engraving data that have been read out are converted according to a first function into at least one engraving depth target value per cup. A control signal for an engraving tool drive system is activated at a beginning of the engraving of a cup so that the engraving tool executes an operating stroke from an idle position in a direction towards the print form, and after the engraving of the cup the tool is guided back into the idle position for the reset element. In the engraving of the cups, operational strokes of the engraving tool are continuously measured from the idle position. During the engraving of the cups, a distance between a jacket surface of the print form and the engraving tool is continuously measured in a region of the engraving tool. Engraving depth actual values are determined from differences between the operational strokes and the respective distance. The engraving depth target values are compared with the determined engraving depth actual values. The control signal is modified given equality of the engraving depth target values and the engraving depth actual values. For the engraving of the cups, a motion relative to the print form in a secondary engraving direction is executed with the engraving device. A system is also provided for performing the above-indicate method.

By means of the invention, in particular the disturbing time-dependent drift of a conventional electromagnetic engraving device due to the instability of the electronic driving and the damping is reduced. In addition, during the engraving different material hardnesses of the print cylinder and distance fluctuations between the engraving device and the print cylinder due to non-roundness or deformation of the print cylinder are compensated without the use of a conventional mechanical sliding foot, which normally provides for a constant distance between the engraving tool and the print cylinder. Overall, short engraving times and a good engraving quality are achieved.

The invention is explained in more detail below on the basis of FIGS. 1 to 4.

DESCRIPTION OF THE PREFERRED EMBODIMENTS

Figure 1:
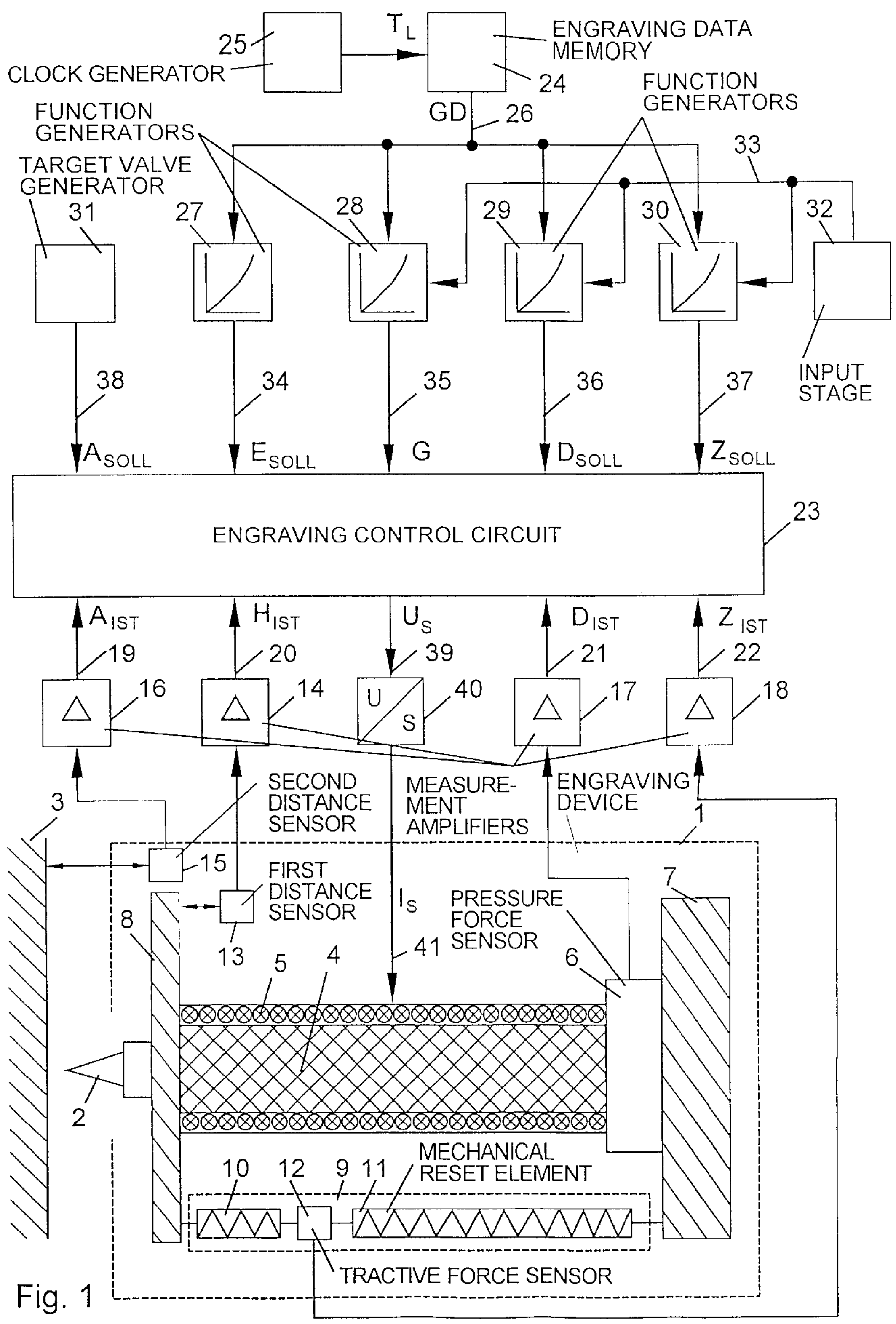
FIG. 1 shows the design of an embodiment for an engraving device for engraving print forms for rotogravure, as well as an embodiment for a means for controlling the engraving device, in the form of a schematic block switching diagram.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

FIG. 1 shows the design of an embodiment for an engraving device for the engraving of print forms, in particular of print cylinders, for rotogravure, in a sectional representation, as well as an embodiment for a [means] unit for controlling the engraving device, in the form of a schematic block switching diagram.

The engraving device 1 with an engraving tool 2 as a cutting tool engraves a series of cups in the circumferential direction (main engraving direction) in the jacket surface of a rotating print cylinder 3, only a section of which is indicated. The surface engraving takes place by means of a relative motion between the engraving device 1 and the print cylinder 3 in the axial direction (secondary engraving direction) of the print cylinder 3.

The engraving device 1 essentially is formed of a drive system for the engraving tool 2. The engraving tool drive system can be an electromagnetic drive system or else a drive system with a solid-state actuator element, e.g. made of an electrostrictive, piezocrystalline, or magnetostrictive material. In the embodiment, the engraving tool drive system comprises a cylindrical actuator element 4 made of a magnetostrictive material and a magnet coil 5 that surrounds the actuator element 4. The actuator element 4 is designed as a massive body, or is formed of a number of magnetostrictive individual elements with insulating intermediate layers. As a magnetostrictive material, for example the material Terfenol-D™, commercially available from the company Etrema Products, Inc., Ames, Iowa, can be used. An actuator control current $I_S$ that flows through the magnet coil 5 produces in the magnet coil 5 a magnetic field in the direction of the cylinder axis of the actuator element 4. By means of the magnetic field, the actuator element 4 essentially experiences a change of length in the direction of its cylinder axis.

One frontal side of the actuator element 4 is connected with a stationary abutment 7 via a pressure force sensor 6. On the opposite frontal side of the actuator element 4, a front plate 8 is attached, on which the engraving tool 2 is mounted with an engraving tool tip, e.g. made of a diamond. The pressure force sensor 6 can alternatively be located between the front plate 8 and the actuator element 4, or it is also possible for two pressure force sensors to be mounted between the actuator element 4 actuator element 4 and the front plate 8.

The engraving device 1 is oriented to the print cylinder 3 in such a way that the tip of the engraving tool 2 is directed radially onto the print cylinder 3. The change in length of the actuator element 4 causes an operating stroke H of the engraving tool 2 in the direction towards the print cylinder 3. The magnitude of the operating stroke H is dependent on the actuator control current $I_S$ is supplied to the magnet coil 5. The relationship between the operational stroke H and the actuator control current $I_S$ is approximately linear if the operating point in the linear part of the characteristic curve of the actuator element 4 is located outside saturation.

In order to enlarge the operational stroke H of the engraving tool 2, a mechanical lever system or a hydraulic system can additionally be connected between the engraving tool 2 and the actuator element 4. A suitable power assist may also be intermediately connected.

The actuator element 4 is pre-stressed by a reset element 9 whose reset force brings the actuator element 4 with the engraving tool 2 into a defined idle position after an operating stroke H. In the embodiment, the resetting force is produced by a mechanical reset element 9 that is formed of at least one tension spring, e.g. of two pre-stressed tension springs 10, 11 connected in series, free ends of which are fastened to the abutment 7 and to the front plate 8. The mechanical reset element 9 comprises a tractive force sensor 12, which, as shown in the embodiment, is attached between the tension springs 10, 11. Alternatively, the tractive force sensor 12 can also be attached between the front plate 8 and the tension spring 10, or between the tension spring 11 and the abutment 7. It is also possible to provide several tractive force sensors. Piezocrystalline pressure pickups can for example be used as a pressure force sensor 6 and tractive force sensor 12.

Instead of a mechanical reset element with tractive springs, another reset element, e.g. made of a magnetostrictive material, with a tractive force measurement apparatus, can also be used.

The specified construction of the engraving device 1 can be modified in any suitable manner.

The operational strokes H of the engraving tool 2 from its idle position in the direction towards the jacket surface of the print cylinder 3 are measured by means of a stationary first distance sensor 13, which determines for example the respective distance to the movable front plate 8. The measurement signal produced in the first distance sensor 13 is supplied to a first measurement amplifier 14, in which the measurement signal is amplified and linearized corresponding to the non-linear characteristic curve of the first distance sensor 13. Taking into account the construction distance between the engraving tool 2 in its idle position and the stationary first distance sensor 13, the measurement amplifier 14 is thereby calibrated in such a way that in the idle position of the engraving tool the measurement signal has the value zero. The measurement signal at the output of the first measurement amplifier 14 is thus a measure for the operational stroke actual value HIST of the engraving tool 2 from its idle position (FIG. 2).

The distance A between the jacket surface of the print cylinder 3 and the engraving tool 2 in its idle position can, for example, fluctuate due to a non-roundness, a deformation, or a faulty mounting of the print cylinder 3. Since the jacket surface of the print cylinder 3 serves as a reference surface for the engraving depth of the engraving tool 2, the distances A are respectively measured at the location of engraving of the cups, by means of a second distance sensor 15. The second distance sensor 15 can be fastened to the movable front plate 8 or can be stationary. The measurement signal produced in the second distance sensor 15 is supplied to a second measurement amplifier 16, and is there likewise amplified, and is linearized corresponding to the non-linear characteristic curve of the distance sensor 15. Taking into account the constructive distance between the engraving tool 2 in its idle position and the stationary second distance sensor 15, the measurement amplifier 16 is thereby adjusted in such a way that the measurement signal at the output of the second measurement amplifier 16 is a measure for the respective distance actual values $A_{IST}$ between the jacket surface of the print cylinder 3 and the engraving tool 2 in its idle position (FIG. 2). Capacitive or optical sensors can for example be used as distance sensors 13, 15.

The difference values between the operational stroke actual values $H_{IST}$ of the engraving tool 2 and the distance actual values $A_{IST}$ between the jacket surface of the print cylinder 3 and the engraving tool 2 in its idle position at the engraving location of the cups yield, in the engraving, the engraving depth actual values $E_{IST}$ of the cups (FIG. 2). The engraving depths of the cups are a measure for the tone values to be reproduced.

With the pressure force sensor 6, the pressure forces are measured with which the engraving tool 2 penetrates into the print cylinder 3, or, respectively, with which the basic surface of the actuator element 4 presses on the abutment 7. Up until contact between the engraving tool 2 and the jacket surface of the print cylinder 3, the pressure force is zero, and then increases, due to the increasing cross-sectional surface of the engraving tool 2, with the penetration depth of the engraving tool 2 into the print cylinder 3. The measured pressure forces are in addition a measure for the material hardness, possibly differing in a location-dependent manner, of the print cylinder 3 to be engraved, and for the cutting quality or, respectively, for the degree of wear of the engraving tool 2.

Exceedings of the measured pressure forces, for example due to tool breakage, can be displayed if necessary.

The measurement signal produced in the pressure force sensor 6 is supplied to a third measurement amplifier 15, in which the measurement signal is likewise amplified and linearized corresponding to the non-linear characteristic curve of the pressure force sensor 6. The linearized measurement signal at the output of the third measurement amplifier 7 are the pressure force actual values $D_{IST}$, with which the engraving tool 2 penetrates into the print cylinder 3.

In a fourth measurement amplifier 18, the measurement signal of the tractive force sensor 12 at the reset element 9 is converted into a linearized measurement signal, which is a measure for the tractive force actual values $Z_{IST}$ with which the actuator element 4 is reset into its idle position and pre-stressed. Due to the change in length of the tractive springs 10, 11, the tractive force is dependent on the operating strokes H or, respectively, on the distances A. With the aid of the tractive force measurement, fluctuations of the reset force, due for example to a defective tractive spring or due to the spring constants changing with temperature of the tractive springs, can be determined. Impermissible fluctuations of the tractive force can be displayed. With the aid of the results of the tractive force measurement, a correction of the pressure force measurement can also advantageously be carried out.

The measured operational stroke actual values $H_{IST}$, the distance actual values $A_{IST}$, the pressure force actual values $D_{IST}$ and the tractive force actual values $Z_{IST}$ move via lines 19, 20, 21, 22 to actual value inputs of an engraving control circuit 23. The engraving control circuit 23 additionally comprises target value inputs that are charged with corresponding target values.

The engraving data "GD" required for the engraving of the print cylinder 3 are stored in an engraving data memory 24. An engraving datum of at least 30 one byte is allocated to each cup to be engraved, which datum contains, as engraving information, the tone value to be reproduced between "0" (white) and "255" (black).

The engraving data GD are obtained for example in a scanner by means of point-by-point and line-by-line optoelectronic scanning of an image to be reproduced.

In the engraving of the print cylinder 3, the engraving data GD are read out from the engraving data memory 24 by means of the pulses of a read pulse sequence $T_L$. The read pulse sequence $T_L$ is obtained in a clock generator 25. The clock generator 25 is for example designed as a rotary impulse generator that is coupled mechanically with the shaft of the print cylinder 3, so that the read pulse sequence $T_L$ is synchronized with the rotational motion of the print cylinder 3. The engraving times for the cups are derived from the pulses of the read pulse sequence $T_L$. The pulse spacings determine the cup spacings in the circumferential direction, corresponding to the rotogravure raster. The axial cup spacings of the rotogravure raster are determined by means of the relative motion between the engraving device 1 and the print cylinder 3) in the axial direction of the print cylinder 3.

The engraving data GD read out from the engraving data memory 24 are supplied in parallel to four function generators 27, 28, 29, 30 via a line 26. In the embodiment, the function generators 27, 28, 29, 30 are designed as table memories with integrated D/A converters, in which the engraving data GD are converted into analog values on the basis of functions stored in tabular form, namely into the engraving depth target values $E_{SOLL}$ for the cups, into the pressure force target values $D_{SOLL}$ and into the tractive force target values $Z_{SOLL}$, as well as into engraving signal values G for driving the actuator element 4. In addition, a distance target value $A_{SOLL}$ for the distance between the print cylinder 3 and the engraving tool idle position is predetermined in a target value generator 31. In an input stage 32, various material hardnesses of the print cylinder 3 to be engraved can be manually inputted.

In the table memory 27, the engraving depth target values $E_{SOLL}$, determined according to the function $E_{SOLL}$=f(GD), for the cups are stored in retrievable fashion by means of the functionally associated engraving data GD. The function $E_{SOLL}$=f(GD) reproduces the relation between the engraving data GD, representing the tone values to be reproduced, and those engraving depth target values $G_{SOLL}$ that must be achieved in the print cylinder 3 in order to achieve a print with correct tone values. For the engraving datum GD=0 (white), the target engraving depth of a cup is for example 35 $\mu$m and for the engraving datum GD=255 (black) the target engraving depth is for example 5 $\mu$m.

In the table memory 27, in the specified embodiment an engraving depth target value $E_{SOLL}$ is stored for each engraving datum GD, which target value indicates the maximum target engraving depth of the relevant cup. Alternatively, in the table memory 27 a multiplicity of engraving depth target values $E_{SOLL}$ can also be stored for each engraving datum GD in the form of an engraving depth profile for the relevant cup, which describes the desired path of the engraving tool 2 upon insertion and withdrawal into the or out of the print cylinder 3 during the engraving of a cup. In this case, the engraving depth target values $E_{SOLL}$ of the engraving depth profile are read out with a pulse sequence from the table memory 27, which has a correspondingly higher frequency than the read pulse sequence $T_L$.

In the table memory 28, the engraving signal values G, determined according to the function G=f(GD), are stored retrievably by means of the functionally associated engraving data "GD". The function G=f(GD) reproduces the relationship between the engraving data GD and those engraving signal values G for the actuator element 4 that are required in order to achieve a particular penetration depth of the engraving tool 2 into the print cylinder 3. The greater the penetration depth of the engraving tool 2, the larger the engraving signal values G or, respectively, the larger the forces that are required for the penetration of the engraving tool 2 into the print cylinder 3, due to the increasing cross-sectional surface of the engraving tool 2.

In the table memory 29, the pressure force target values $D_{SOLL}$, determined according to the function $D_{SOLL}$=f(GD) are stored in retrievable fashion by means of the functionally associated engraving data GD. The function $D_{SOLL}$=f(GD) reproduces the relationship between the pressure force target values $D_{SOLL}$ that are exerted on the engraving tool 2 at the various engraving depths due to the shape of the engraving tool and the engraving data "GD" or, respectively, engraving depths. For a particular engraving depth, the pressure force target value $D_{SOLL}$ thereby corresponds to the maximum pressure force that occurs approximately when this engraving depth is reached.

In the table memory 30, the tractive force target values $Z_{SOLL}$, determined according to the function $Z_{SOLL}$=f(GD), are stored retrievably by means of the functionally associated engraving data "GD." The function $Z_{SOLL}$=f(GD) reproduces the relationship between the engraving data GD and the corresponding tractive force target values $Z_{SOLL}$ of the reset element 9 that occur in the engraving of cups of a particular engraving depth. Due to the expansion of the pre-stressed tractive springs 10, 11, the tractive force of the reset element 9 increases as the engraving depth increases. The tractive force target value $Z_{SOLL}$ for a particular engraving depth thereby corresponds to the maximum tractive force that occurs approximately when this engraving depth is reached.

Because the engraving signal values G, the pressure force target values $D_{SOLL}$, and the tractive force target values $Z_{SOLL}$ are dependent not only on the engraving data GD, but also on the material hardness of the print cylinder 3, several value tables with the parameter "material hardness" are usefully stored in the three table memories 28, 29, 30, of which a respective value table is selected, via a control line 33, corresponding to the "material hardness" input in the input stage 32, and this value table is activated for the engraving.

The functions $E_{SOLL}$=f(GD) with the parameter "material hardness," stored in the table memory 27, can be determined by means of test or sample engravings with print cylinders 3 of different material hardness, and by printings with the engraved print cylinders. First, with predetermined engraving data GD in the form of a tone value wedge between "black" and "white," a number of cups are engraved into the print cylinders 3 of different material hardnesses. The engraving depths or, respectively, cross-diagonals of the engraved cups are then measured, and subsequently the prints are manufactured in which the tone values achieved on the basis of the engraving depths are measured. From the tone values achieved in the prints, or, respectively, the engraving depths required therefor, and the associated engraving data, the functions $E_{SOLL}$=f(GD) can then be determined.

In such a test engraving, by means of corresponding measurements the functions G=f(GD), $D_{SOLL}$=f(GD) and $Z_{SOLL}$=f(GD) can also be determined at the same time and can be stored in the three table memories 28, 29, 30.

The determined values are supplied from the table memories 27, 28, 29, 30 to the target value inputs of the engraving control circuit 23 via lines 34, 35, 36, 37. Via a line 38, the distance target value $A_{SOLL}$, predetermined in the target value generator 31, for the distance A between the jacket surface of the print cylinder 3 and the engraving tool 2 in its idle position is supplied to the target value inputs of the engraving control circuit 23.

In the engraving control circuit 23, an actuator control voltage Us is produced from the engraving signal values G, which control voltage is supplied to a voltage/current transducer 40 via a line 39. In the voltage/current transducer 40, the actuator control voltage $U_S$ is converted into the actuator control current $I_s$ for the actuator element 4, which current is supplied to this element via a line 41.

In order to illustrate the manner of operation of the engraving device 1, FIG. 2 shows various operational strokes H of the engraving tool 2 during the engraving, in the form of graphic representations.

Figures 2A, 2B, 2C, 2D:
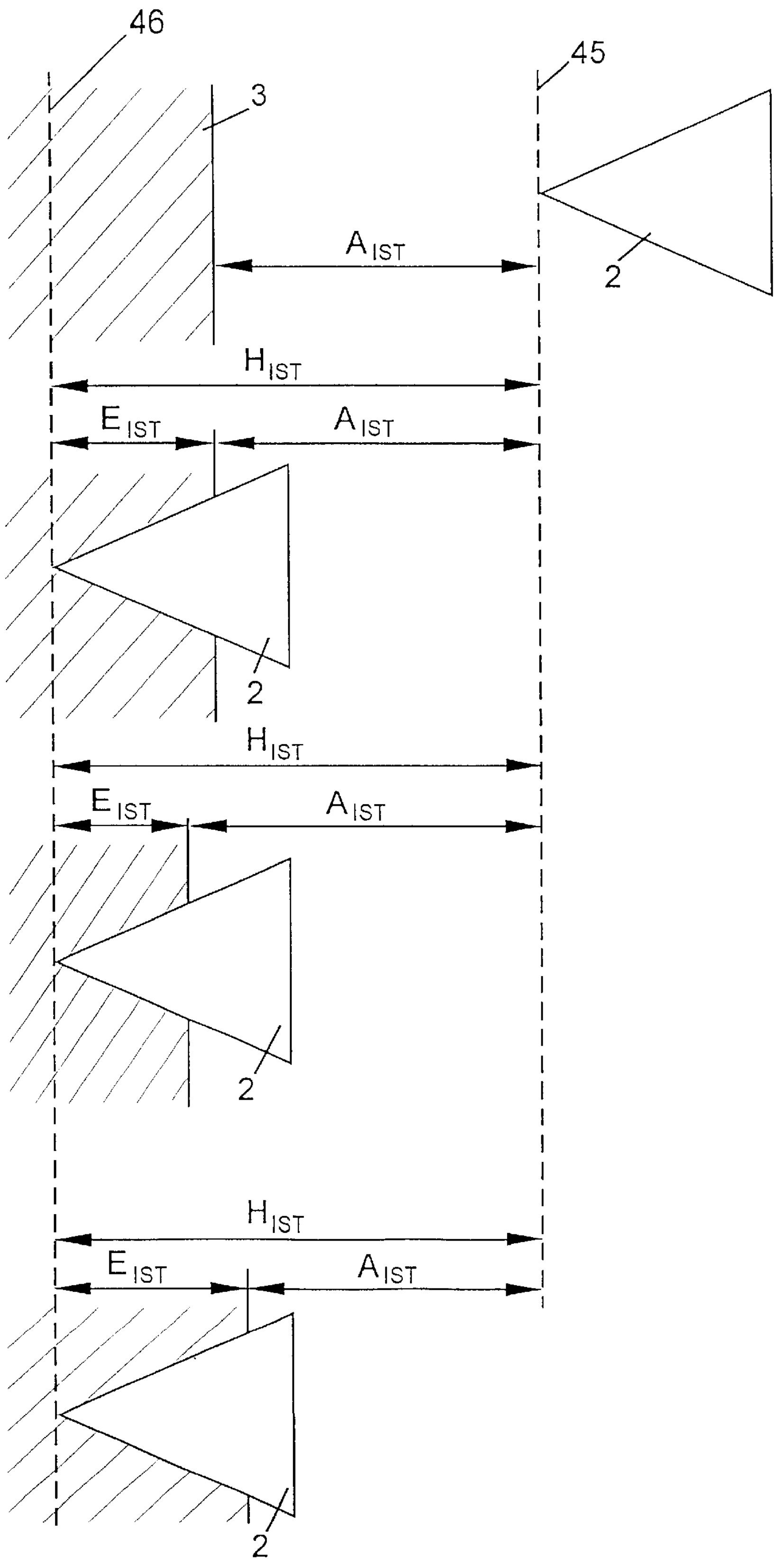
FIG. 2*a* shows an idle position of an engraving tool of an engraving device.
FIG. 2*b* shows the engraving tool of the engraving device having done an operational stroke, whereby a first distance actual value is measured.
FIG. 2*c* shows the engraving tool of the engraving device having done the same operational stroke, whereby a second distance actual value is measured.
FIG. 2*d* shows the engraving tool of the engraving device having done the same operational stroke, whereby a third distance actual value is measured.

FIG. 2*a* shows the engraving tool 2 in the idle position 45. The operational stroke actual value $H_{IST}$ and the measurement signal at the output of the measurement amplifier 14 (FIG. 1) are likewise equal to zero. The second distance sensor 15 (FIG. 1) measures the momentary distance actual value $A_{IST}$ between the print cylinder 3 and the engraving tool 2 in its idle position 45.

In FIG. 2*b*, the engraving tool 2 is in an operational position 46, in which the engraving tool 2 has executed an operational stroke $H_{IST}$ for the engraving of a cup in the print cylinder 3 and has penetrated into the print cylinder 3. The operational stroke actual value $H_{IST}$ that has been achieved is measured by the first distance sensor 13 (FIG. 1). The second distance sensor 15 (FIG. 1) has in turn determined the momentary distance actual value $A_{IST}$, whereby it is assumed that the distance A is constant. The engraving depth actual value $E_{IST}$ of the engraving tool 2 in the print cylinder 3, which determines the tone value to be reproduced, results from the difference between the measured operational stroke actual value $H_{IST}$ and the measured distance actual value $A_{IST}$.

In FIG. 2*c*, the engraving tool 2 has executed the same actual operating stroke $H_{IST}$ in the operational position 45 as in FIG. 2*b*, but the distance actual value $A_{IST}$ may have increased due to a non-roundness of the print cylinder 3 or a faulty bearing of the print cylinder 3. In this way, given a constant operational stroke H there results a too-small engraving depth actual value $E_{IST}$ In this case, the operational stroke must be correspondingly enlarged in order to achieve the same engraving depth as in FIG. 2*b*.

In FIG. 2*d*, the engraving tool 2 has again executed the same actual operational stroke $H_{IST}$ in the operating position 45 as in FIG. 2*b*, but the distance actual value $A_{IST}$ may have become smaller due to a non-roundness of the print cylinder 3. In this way, given a constant operational stroke H there results a too-large engraving depth actual value $E_{IST}$ In this case, the operational stroke H must be correspondingly reduced in order again to achieve the same engraving depth as in FIG. 2*b*.

Figure 3A:
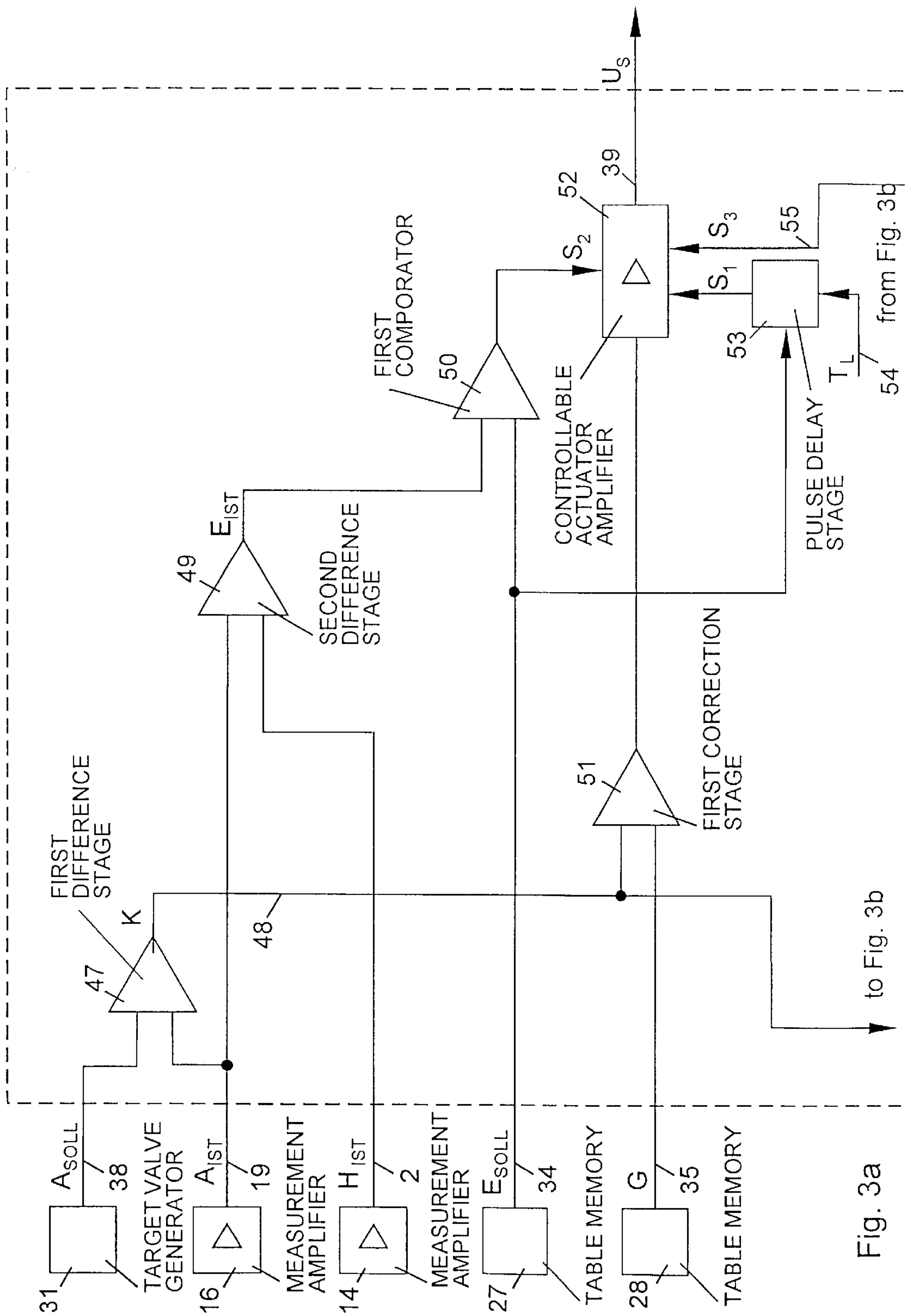
FIG. 3*a* shows a first partial block of a schematic block switching diagram of an engraving control circuit.
Figure 3B:
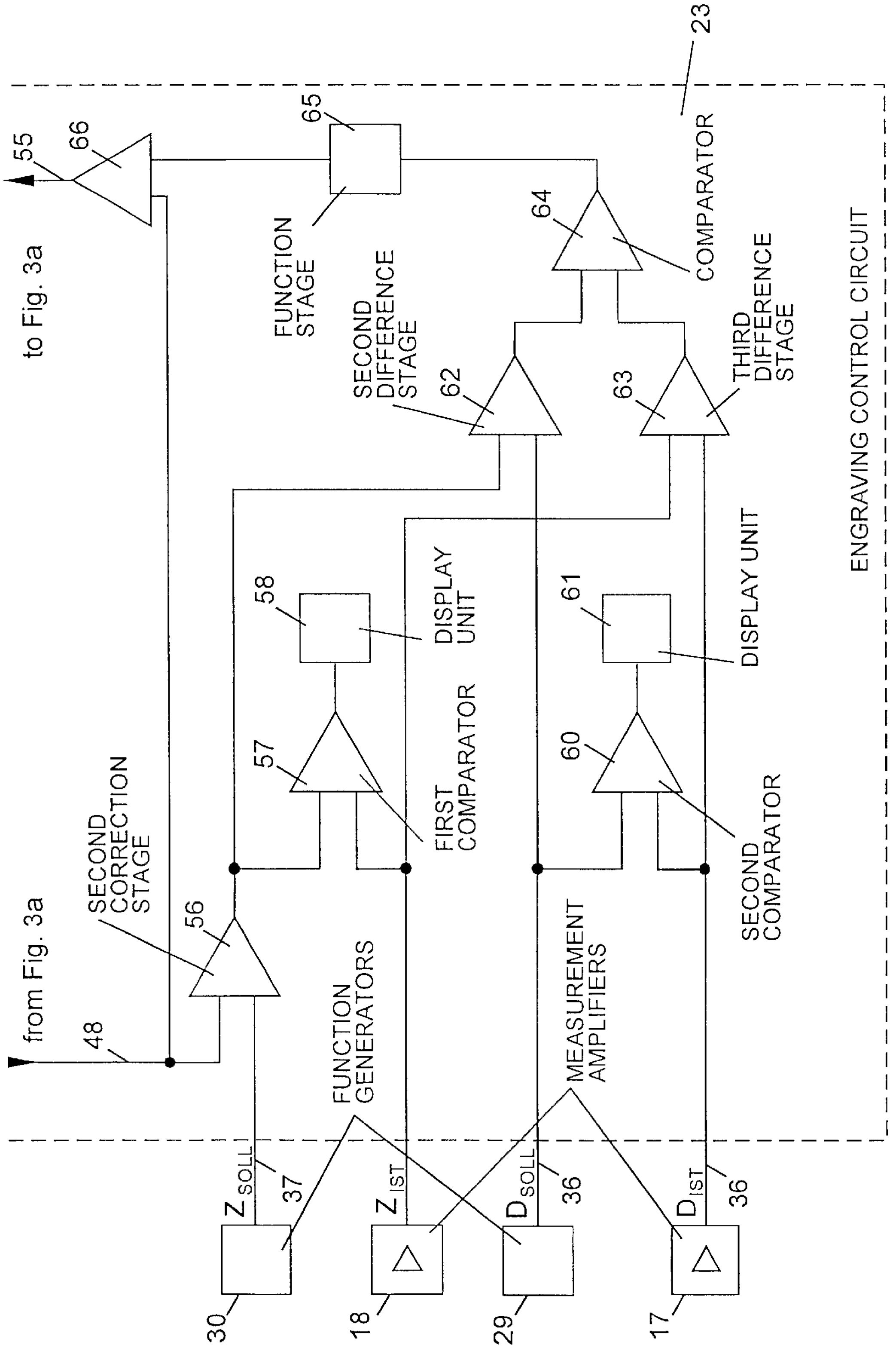
FIG. 3*b* shows a second partial block of a schematic block switching diagram of the engraving control circuit.

FIG. 3 shows a schematic block switching diagram of the engraving control circuit 23, divided into two partial block switching diagrams according to FIGS. 3*a* and 3*b*.

In FIG. 3*a*, in a first difference stage 47 the difference values between the distance target value $A_{SOLL}$, predetermined in the target value generator 31, and the distance actual values $A_{IST}$, supplied by the second measurement amplifier 16, are continuously formed. The difference values are a measure for the distance fluctuations between the jacket surface of the print cylinder 3 and the idle position of the engraving tool. The difference values on a line 48 serve as correction values K for value correction on the basis of the determined distance fluctuations. By means of the continuous taking into account of the distance fluctuations, a mechanical sliding foot, which serves to maintain a constant distance between the cylinder surface and the engraving device in conventional engraving devices, can advantageously be omitted.

In a second difference stage 49, the engraving depth actual values $E_{IST}$ of the engraved cups are continuously determined by means of difference formation between the operational stroke actual values $H_{IST}$, coming from the first measurement amplifier 14, and the distance actual values $A_{IST}$ coming from the second measurement amplifier 16.

The engraving depth target values $E_{SOLL}$ read out from the table memory 27 are then compared with the engraving depth actual values $E_{IST}$ in a first comparator 50.

In a first correction stage 51, the engraving signal values G read out from the table memory 28 are corrected corresponding to the determined distance fluctuations by means of sign-correct addition of the correction values K on the line 48. The corrected engraving signal values G are supplied to the signal input of a controllable actuator amplifier 52, which produces at its signal output the actuator control voltage $U_S$. The actuator control voltage $U_S$ is supplied to the voltage/current transducer 40 via the line 39, which transducer converts this control voltage into the actuator control current $I_s$ for the actuator element 4 of the engraving device 4.

The engraving depth target values $E_{SOLL}$ read out from the table memory 27 are additionally supplied to a pulse delay stage 53 to which the read pulse sequence $T_L$ produced in the pulse generator 1 is supplied via a line 54. In the pulse delay stage 53, the individual pulses of the read pulse sequence $T_L$ are differentially time-delayed dependent on the current engraving depth target values $E_{SOLL}$, and the time-delayed pulse is supplied, as a first control signal $S_1$ for the determination of the respective engraving starting point of a cup, to a first control input of the actuator amplifier 52.

Given equality of the engraving depth target value and the engraving depth actual value, the first comparator 50 respectively produces at its output a second control signal $S_2$, which is supplied to a second control input of an actuator amplifier 52.

The actuator control current $I_S$ is respectively activated at the beginning of the engraving of a cup by means of the first control signal $S_1$, which is time-delayed in relation to the pulses of the read pulse sequence $T_L$, whereby the actuator element 4 is activated, while the second control signal $S_2$ in the specified embodiment deactivates the actuator control current $I_S$ when the target engraving depth, which is the maximum engraving depth for a cup, is achieved, in order to deactivate the actuator element 4. The amplitude of the actuator current $I_S$ is controlled by the engraving signal values G supplied to the actuator amplifier 52 in a manner corresponding to the tone values to be engraved.

By means of the activation delay of the actuator control current $I_S$, controlled dependent on the respective target engraving depth, it is advantageously achieved that the centers of gravity of the engraved cups agree approximately with the rotogravure raster, independent of the engraving depth.

As an alternative to the tone-value-dependent amplitude controlling of the actuator current $I_S$, the actuator element 4 can also be charged with a nominal actuator control current 1s that is independent of the tone values to be engraved, which nominal control current is respectively deactivated by the second control signal $S_2$ when the target engraving depth has been achieved.

Given operation with a nominal actuator control current $I_S$, a time interval for the engraving of a cup can also be determined. If the target engraving depth is not achieved within the determined time interval, an increasing of the nominal actuator control current $I_S$ can for example be carried out.

The chronological curve of the actuator control current $I_S$ within its activation time can be selected in a suitable manner, for example rectangular, step-shaped or sinusoidal.

It can also occasionally be useful if the actuator control current $I_S$ is not deactivated by the second control signal $S_2$ when the maximum engraving depth of a cup has been achieved, but rather is modified in such a way that it decays during the withdrawal of the engraving tool 2 after the maximum engraving depth has been achieved.

Given the use of an engraving depth profile for a cup to be engraved, for each determined agreement of a momentary engraving depth actual value $E_{IST}$ with an engraving depth target value $E_{SOLL}$ of the engraving depth profile, a second control signal $S_2$ is produced that respectively modifies the actuator control current $I_S$ for the actuator element 4 within the individual control signal intervals. The required direction of change and/or the required magnitude of change of the actuator control current $I_S$ can thereby be determined from the comparison of two respective successive engraving depth target values of the engraving depth profile.

By means of a third control signal $S_3$ on a line 55, the amplification of the actuator amplifier 54 can be modified. With the aid of the third control signal $S_3$, an additional correction of the engraving depth, given locus-dependent fluctuations of the material hardness of the print cylinder 3, is advantageously carried out by means of an increasing of the actuator control current Is, controlled via the amplification.

By means of a chronological displacement of the pulses of the read pulse sequence $T_L$, controlled dependent on a contour in an image to be reproduced, or by means of a correspondingly controlled displacement of the activation times for the actuator control current $I_S$ in the pulse delay stage 53, an improved reproduction of contours can additionally advantageously be carried out by means of a displacement of the centers of gravity of the engraved cups in the circumferential direction of the print cylinder 3.

A corresponding displacement of the centers of gravity of the engraved cups in the axial direction of the print cylinder 3 can take place by means of a mechanical transverse deflection of the engraving tool 2, or, respectively, of the actuator element 4 connected with the engraving tool 2, by means of an electrically controllable deflector, formed for example, of a piezocrystalline or magnetostrictive material.

By means of the controlled chronological displacement of the pulses of the read pulse sequence $T_L$, or, respectively, of the activation times for the actuator control current $I_S$, in combination with the transverse deflection of the actuator element 4, rotogravure rasters can advantageously be engraved with practically any raster angulation, which is not possible with conventional electromagnetic engraving devices.

In FIG. 3*b*, the tractive force target values $Z_{SOLL}$, read out from the table memory 30, are corrected in a second correction stage 56 by means of sign-correct addition of the correction values K on the line 48. The tractive force correction takes into account changes in length of the tractive springs 10, 11 of the reset element 9 due to the distance fluctuations between the jacket surface of the print cylinder 3 and the engraving tool idle position. The corrected tractive force target values $Z_{SOLL}$ are then compared in a first comparator 57 with the tractive force actual values $Z_{IST}$ coming from the fourth measurement amplifier 18. A display unit 58 is connected downstream from the first comparator 57, in which display unit a previously determined maximum deviation between tractive force target values $Z_{SOLL}$ and tractive force actual values $Z_{IST}$ is displayed.

The pressure force target values $D_{SOLL}$, read out from the table memory 29, and the pressure force actual values $D_{IST}$, coming from the third measurement amplifier 17, are compared with one another in a second comparator 60. A display unit 61 is likewise connected downstream from the second comparator 60, in which display unit a previously determined maximum deviation between pressure force target values $D_{SOLL}$ and pressure force actual values $D_{IST}$ can be displayed.

For the correction of the pressure force measurement by means of the values determined in the measurement of the tractive force, in a second difference stage 62 the target force differences $\Delta F_{SOLL}$ are formed from the pressure force target values $D_{SOLL}$ and the corrected tractive force target values $Z_{SOLL}$, and, in a third difference stage 63, the corresponding actual force differences $\Delta F_{IST}$ are formed from the pressure force actual values $D_{IST}$ and the tractive force actual values $Z_{IST}$.

In a second comparator 64, target force differences $\Delta F_{SOLL}$ and actual force differences $\Delta F_{IST}$ are compared with one another, and a signal $\Delta F$ is derived from the comparison, which is a measure for the locus-dependent material hardness of the print cylinder 3 or for modifications of the geometry of the engraving tool 2. In a function stage 65, connected downstream from the comparator 64, the signal $\Delta F$ is then converted into the control signal $S_3$, which is then corrected in a further correction stage 66 by means of the correction values K on the line 48, in a manner corresponding to the determined distance fluctuations. The corrected auxiliary signal $S_3$ is then supplied via the line 55 to the actuator amplifier 52, in order to correct the control current $I_s$ for the actuator element 4 in a manner corresponding to the (possibly different) material hardnesses of the print cylinder 3.

In FIG. 4, the chronological signal curve in the engraving of two cups with different depths, with the engraving depth target values $E_{1SOLL}$ and $E_{2SOLL}$ and with the engraving signal values $G_1$ and $G_2$, is shown in a graphic representation.

Figures 4A, 4B, 4C, 4D:
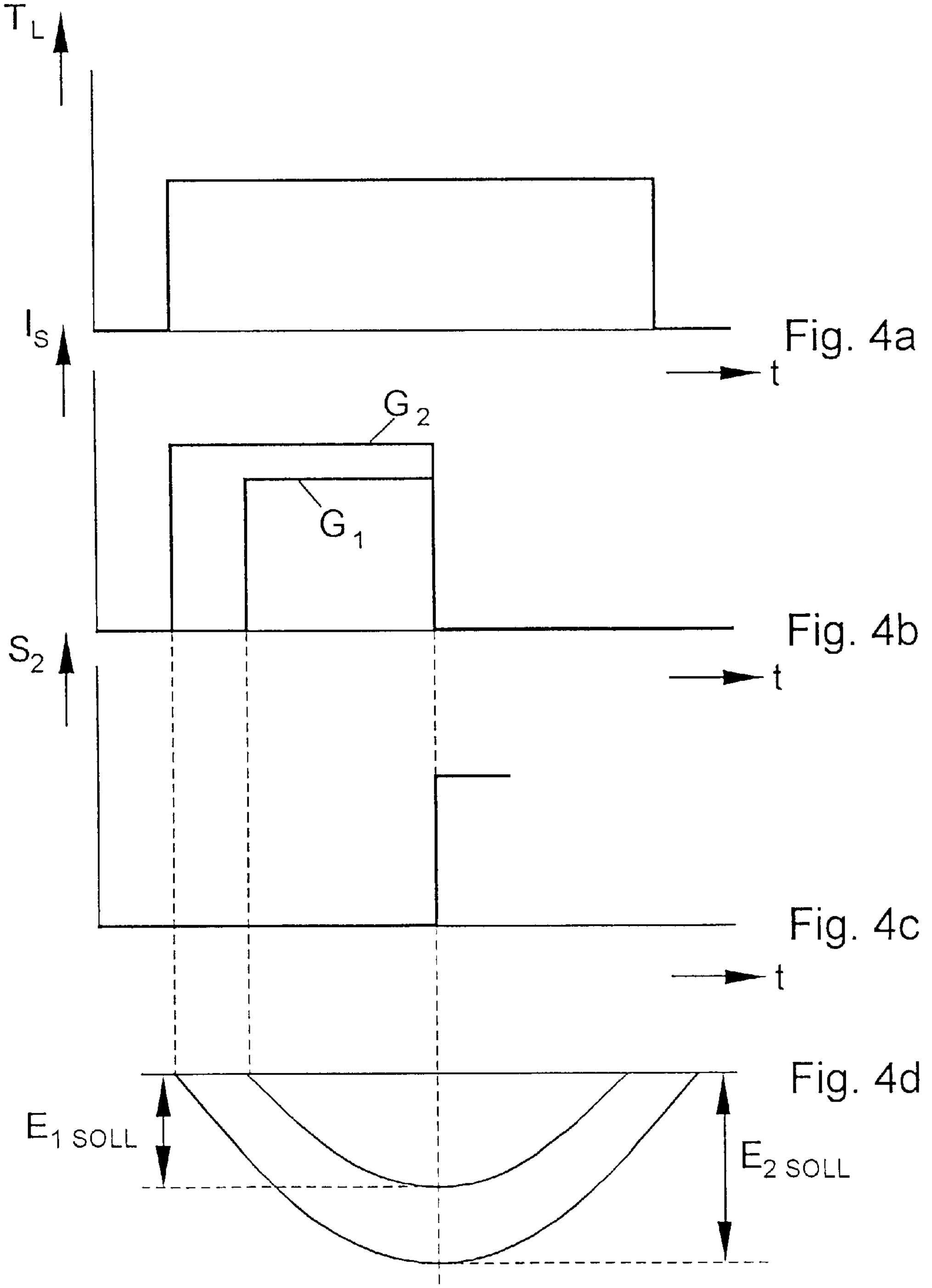
FIG. 4*a* shows the temporal signal pattern of a pulse of a read pulse sequence.
FIG. 4*b* shows the temporal signal pattern of an actuator control current.
FIG. 4*c* shows the temporal signal pattern of a control signal.
FIG. 4*d* shows cross-sections through two engraved cups.

FIG. 4*a* shows a pulse of the read pulse sequence $T_L$.

FIG. 4*b* shows the respective curve of the actuator control current $I_s$ with different activation times corresponding to the engraving depth target values $E_{1SOLL}$ and $E_{2SOLL}$, and with different amplitudes corresponding to the engraving signal values $G_1$ and $G_2$.

FIG. 4*c* shows the curve of the control signal $S_2$, which deactivates the actuator control current $I_S$ when the respective target depth of the cup has been achieved.

In FIG. 4*d*, the cross-sections through two engraved cups with the engraving depth target values $E_{1SOLL}$ and $E_{2SOLL}$ are shown.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. A method for driving an engraving device of an electronic engraving machine for engraving a print form, comprising the steps of:

storing items of engraving information representing tone values as engraving data and retrieving the engraving data for engraving of a sequence of cups in a main engraving direction into the print form with an engraving tool as a cutting tool;

converting the engraving data that have been retrieved according to a first function into at least one engraving depth target value per cup;

activating a control signal for an engraving tool drive system at a beginning of the engraving of a cup so that the engraving tool executes an operating stroke from an idle position in a direction toward the print form, and after the engraving of the cup, guiding the tool back into the position with a reset element;

in the engraving of the cups, continuously measuring operational strokes of the engraving tool from the idle position;

during the engraving of the cups, continuously measuring a distance between a jacket surface of the print form and the engraving tool in a region of the engraving tool;

determining engraving depth actual values from differences between the operational strokes and the measured distance;

comparing the engraving depth target values with the determined engraving depth actual values;

modifying the control signal given equality of the engraving depth target values and the engraving depth actual values; and for the engraving of the cups, executing with the engraving device a motion relative to the print form in a secondary engraving direction.

2. The method according to claim 1, wherein the control signal is respectively deactivated given equality of engraving depth target values and engraving depth actual values.

3. The method according to claim 1, wherein for each cup an engraving depth target value is predetermined as a maximum engraving depth that must be achieved in the engraving of the cup in the print form for a reproduction that is correct with respect to tone values.

4. The method according to claim 1, wherein for each cup a plurality of engraving depth target values are predetermined as an engraving depth profile that describes a path of the engraving tool in the print form during the engraving of the cup.

5. The method according to claim 1, wherein the beginning of the engraving for the cups is determined dependent on the engraving depth target values.

6. The method according to claim 1, wherein:

retrieved engraving data are converted into functionally allocated engraving signal values according to a second function; and the engraving signal values are converted into the control signal for the engraving tool drive system.

7. The method according to claim 6, wherein the engraving data that are read out are converted into functionally allocated pressure force target values according to a third function, which target values may act on the engraving tool during the engraving of the cups of different engraving depths;

actual pressure forces that act on the engraving tool during the engraving are measured as pressure force actual values; and an exceeding of the pressure force target values by the measured pressure force actual values is displayed.

8. The method according to claim 7 wherein the engraving data that are retrieved are converted into functionally allocated tractive force target values according to a fourth function, which target values may be exerted on the reset element;

actual tractive forces that act on the reset element during the engraving are measured as tractive force actual values; and an exceeding of the tractive force target values by the measured tractive force actual values is displayed.

9. The method according to claim 8 wherein first differences are formed from the pressure force target values and the tractive force target values;

second differences are formed from the pressure force actual values and the tractive force actual values;

as a measure for locally different material hardnesses of the print form, the first differences and the second differences are compared with one another; and the control signal for the engraving tool drive system is corrected by means of an auxiliary signal that is dependent on a result of the comparison, in order to compensate an influence of different material hardnesses.

10. The method according to claim 8, wherein the third function and the fourth function are determined during a test engraving by measuring the pressure and tractive forces dependent on the engraving data.

11. The method according to claim 8, wherein a test engraving and the measuring of the pressure and tractive forces is carried out with print forms of different material hardness;

the functions thereby obtained, with the different material hardnesses, are stored as parameters; and the functions required for the engraving corresponding to the respective material hardness of the print form to be engraved are selected before the engraving from stored functions.

12. The method according to claim 8, wherein the engraving signal values, the tractive force target values and an auxiliary signal are corrected with the correction values.

13. The method according to claim 7 wherein as a measure for locally different material hardnesses of the print form, the pressure force target values and the pressure force actual values are compared with one another; and the control signal for the engraving tool drive system is corrected dependent on a result of the comparison in order to compensate an influence of different material hardnesses.

14. The method according to claim 6, wherein the first function and the second function are determined by means of the test engraving of a print form with a number of predetermined engraving data.

15. The method according to claim 1, wherein the control signal has a nominal value that is independent of the engraving data.

16. The method according to claim 15, wherein a time interval for the engraving of a cup is respectively predetermined; and if the engraving depth target value is not achieved in the time interval, the nominal value of the control signal is increased.

17. The method according to claim 1, wherein a distance target value is predetermined for the distance between the jacket surface of the print form and the engraving tool in the idle position;

the difference values between the predetermined distance target value and the measured distance actual values are continuously determined; and the difference values are used as correction values.

18. The method according to claim 1, wherein the engraving tool drive system comprises an electromagnetic actuator element.

19. The method according to claim 1, wherein the engraving tool drive system comprises a solid-state actuator element.

20. The method according to claim 19, wherein the solid-state actuator element is made of piezoelectric material.

21. The method according to claim 19, wherein the solid-state actuator element is made of a magnetostrictive material.

22. The method according to claim 21, wherein the solid-state actuator element of magnetostrictive material is surrounded by a magnet coil through which a control current flows as the control signal.

23. The method according to claims 1, wherein the engraving data are called by means of a read pulse sequence whose pulse intervals determine distances of the cups in the main engraving direction corresponding to a rotogravure raster; and a respective beginning of engraving for the cups is derived by means of a time delay of the pulses of the read pulse sequence, which delay is dependent on the engraving depth target values.

24. A system for controlling an engraving device of an electronic engraving machine for engraving print forms, comprising:

an engraving device, having an engraving tool as a cutting tool for the engraving of cups in the print form, an engraving tool drive system controlled by a control signal, and a reset element for the engraving tool drive system whereby the engraving tool executes an operational stroke from an idle position in the direction toward the print form for the respective engraving of a cup, and, after the engraving of a cup, is guided back into the idle position by means of the reset element;

a control circuit for conversion of items of engraving information representing tone values into the control signal for the engraving tool drive system;

a memory for storage and retrieval of engraving data as items of engraving information;

function generators for conversion of the engraving data into engraving signal values according to predetermined functions, and into engraving depth target values that must be achieved during the engraving of the cups in the print form for a reproduction that is correct with respect to tone values;

a first measurement apparatus for measuring operational strokes of the engraving tool from the idle position as operational stroke actual values in the engraving of the cups;

a second measurement apparatus for continuous measurement of a distance between a jacket surface of the print form and the engraving tool in the idle position, as distance actual values; and an engraving control circuit for conversion of the engraving signal values into the control signal for the engraving tool drive system, taking into account the target values and the actual values.

25. The system according to claim 24, wherein the engraving control circuit comprises:

a difference stage for formation of engraving depth actual values from differences between the measured operational strokes of the engraving tool and the measured distance;

a comparator for respective production of a second control signal given equality of engraving depth target values and engraving depth actual values; and an actuator amplifier for formation of a control current for the engraving tool drive system, whereby the control current is respectively activated by a first control signal at a beginning of the engraving of a cup, and is respectively deactivated by the control signal at the end of the engraving of a cup, given agreement of the engraving depth target value and the engraving depth actual value.

26. The system according to claim 24, wherein a further function generator for conversion of the engraving data that are read out into pressure force target values according to a function, which target values may act on the engraving tool during the engraving of the cups of different engraving depths;

a further measurement apparatus for measuring actual pressure forces that act on the engraving tool during the engraving as pressure force actual values;

a comparator in the engraving control circuit for the comparison of pressure force target values and the pressure force actual values; and a display unit in the engraving control circuit for display of an exceeding of the pressure force target values by the pressure force actual values.

27. The system according to claim 26, further comprising:

a further function generator for conversion of the engraving data that are retrieved into tractive force target values according to a function, which target values may be exerted upon the reset element;

a further measurement apparatus for measurement of actual tractive forces that act on the reset element during the engraving as tractive force actual values;

a comparator in the engraving control circuit for comparison of tractive force target values and tractive force actual values; and a display unit in the engraving control circuit for display of an exceeding of the tractive force target values by the tractive force actual values.

28. The system according to claims 27, wherein an apparatus in the engraving control circuit for the production of a third control signal from the pressure force target values, the pressure force actual values, the tractive force target values and the tractive force actual values, and for the correction of the control signal for the engraving tool drive system by the third control signal in order to compensate influence of different material hardnesses of the print form.

29. The system according to claim 24, wherein a target value generator for predetermining a distance target value for the distance between the jacket surface of the print form and the engraving tool in the idle position;

a comparator in the engraving control circuit for the formation of correction values from the difference values between the predetermined distance target value and the measured distance actual values; and correction stages in the engraving control circuit for the correction of target values with the correction values.

30. The system according to claim 24, further comprising: an input stage for the selection of different functions in the function generators dependent on the respective material hardness of the print form.

31. The system according to claims 24, further comprising the function generators are designed as table memories.

32. The system according to claim 24, further comprising:

a pulse generator for producing a read pulse sequence for reading out the memory; and a pulse delay stage for obtaining the first control signal by time delay of the pulses of the read pulse sequence.

33. An engraving device of an electronic engraving machine for engraving print form, comprising:

an engraving tool as a cutting engraving tool for engraving cups in the print form;

a drive system controlled by a control signal for the engraving tool;

a reset element for the engraving tool drive system, whereby the engraving tool executes an operational stroke from an idle position in a direction toward the print form for the respective engraving of a cup, and, after the engraving of a cup, is guided back into the idle position by means of a reset element;

a first measurement apparatus for measuring operational strokes of the engraving tool from the idle position during the engraving of the cups;

a second measurement apparatus for continuous measurement of a distance between a jacket surface of the print form and the engraving tool in the idle position;

a third measurement apparatus for measurement of pressure forces that act on the engraving tool during the engraving; and a fourth measurement apparatus for measurement of tractive forces that act on the reset element during the engraving.

34. The engraving device according to claim 33, wherein the engraving tool drive system comprises an electromagnetic system.

35. The engraving device according to claim 33, wherein the engraving tool drive system comprises a solid-state actuator element.

36. The engraving device according to claim 35, further comprising the solid-state actuator element being made of a magnetostrictive material.

37. The engraving device according to claim 36, further comprising the solid-state actuator element being made of magnetostrictive material surrounded by a magnet coil through which a control current flows as a control signal.

38. The engraving device according to claim 35, further comprising the solid-state actuator element being made of a piezoelectric material.

39. The engraving device according to claim 35, further comprising:

the solid-state actuator element being designed with a cylindrical shape;

a frontal side, facing away from the print form of the solid-state actuator element being fastened to a stationary abutment; and the engraving tool being attached to another frontal side of the solid-state actuator element in a direction of a cylinder axis of the cylindrical solid-state element.

40. The engraving device according to claim 33, further comprising the reset element being designed as a mechanical reset element.

41. The engraving device according to claim 33, further comprising the reset element being designed as a solid-state actuator element.

42. The engraving device according to claim 33, wherein the reset element is formed of at least one tractive spring.

43. The engraving device according to claim 33, further comprising the third measurement apparatus having at least one pressure sensor for the measurement of the pressure forces.

44. The engraving device according to claim 43, wherein the pressure sensor is arranged between a solid-state actuator element and an abutment.

45. The engraving device according to claim 33, further comprising a power assist connected between the engraving tool and the drive system.

46. The engraving device according to claim 33, further comprising a lever system connected between the engraving tool and the engraving tool drive system.

47. The engraving device according to claim 33, further comprising a hydraulic system connected between the engraving tool and the engraving tool drive system.

48. A method for driving an engraving tool of an electronic engraving machine for engraving a print form, comprising the steps of:

providing engraving information representing tone values as engraving data and utilizing the information for engraving of a sequence of cups into the print form with the engraving tool;

converting the engraving data according to a first function into at least one engraving depth target value per cup;

activating a control signal for an engraving tool drive system at a beginning of the engraving of a cup so that the engraving tool executes an operating stroke from an idle position in a direction toward the print form, and after the engraving of the cup, guiding the tool back into the idle position with;

in the engraving of the cups, continuously measuring operational strokes of the engraving tool from the idle position;

during the engraving of the cups, continuously measuring a distance between a surface of the print form and the engraving tool in a region of the engraving tool;

determining engraving depth actual values from differences between the operational strokes and the measured distance;

comparing the engraving depth target values with the determined engraving depth actual values; and effecting the control signal based on a comparison of the engraving depth target values and the engraving depth actual values.

49. A method for driving an engraving tool of an electronic engraving machine for engraving a print form, comprising the steps of:

providing engraving information representing tone values as engraving data and utilizing the information for engraving of a sequence of cups into the print form with the engraving tool;

converting the engraving data into at least one engraving depth target value per cup;

activating a control signal for an engraving tool drive system at a beginning of the engraving of a cup so that the engraving tool executes an operating stroke from a first position in a direction toward the print form, and after the engraving of the cup, guiding the tool back into the first position;

in the engraving of the cups, measuring operational strokes of the engraving tool from the first position;

during the engraving of the cups, measuring a distance between a surface of the print form and the engraving tool;

determining engraving depth actual values from differences between the operational strokes and the measured distance;

comparing the engraving depth target values with the determined engraving depth actual values; and modifying the control signal based on a comparison of the engraving depth target values and the engraving depth actual values.

* * * * *